Aug. 30, 1927.

T. F. TAYLOR 1,640,738

DIRIGIBLE HEADLIGHT

Filed Oct. 21, 1925       3 Sheets-Sheet 1

INVENTOR.
Thomas F. Taylor.
BY
ATTORNEYS.

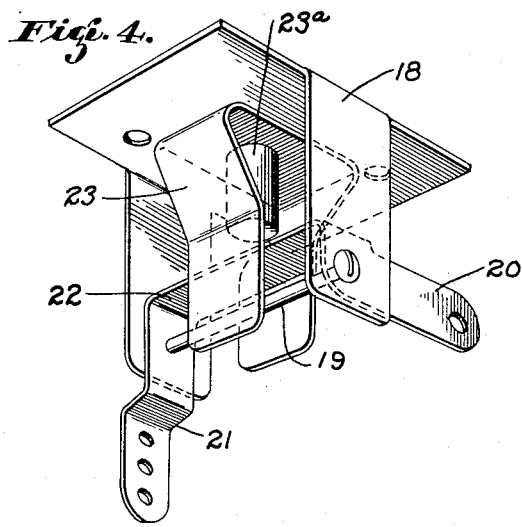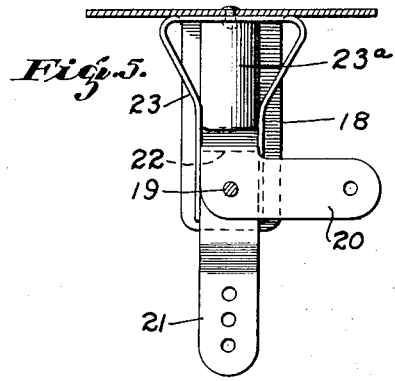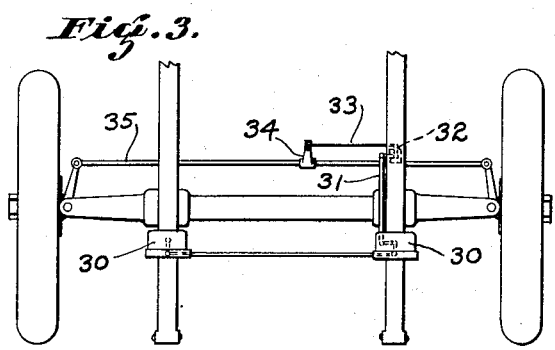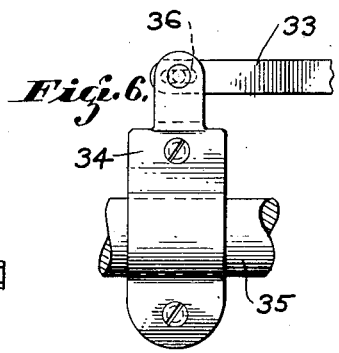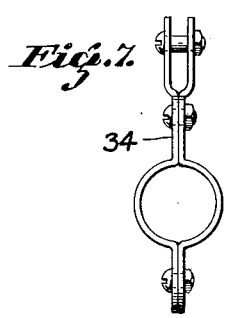

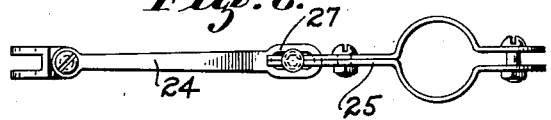
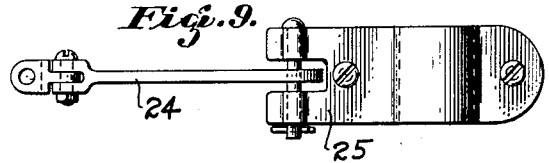
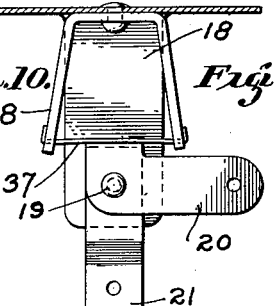
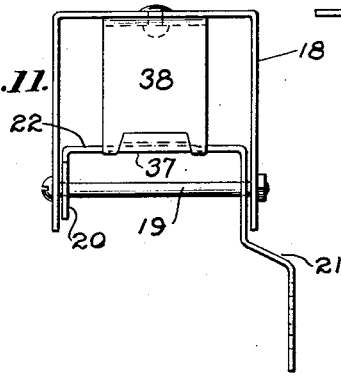
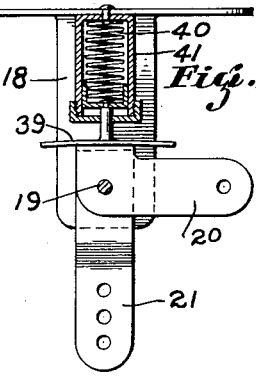
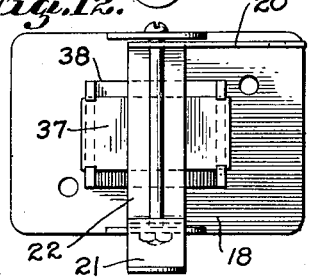
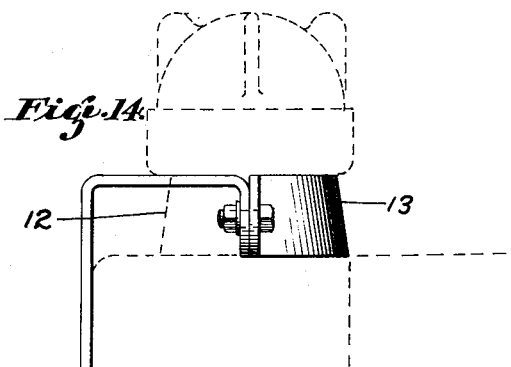
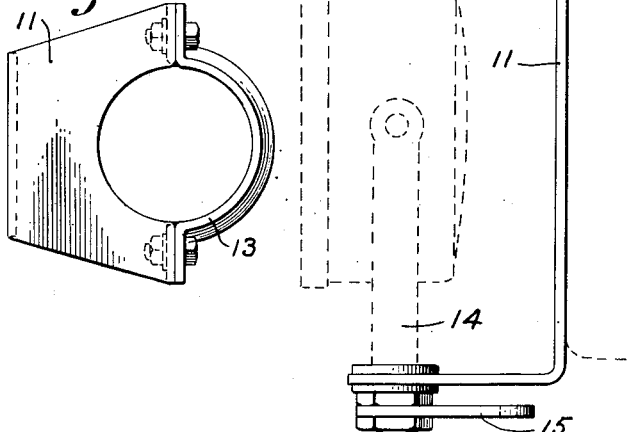

Patented Aug. 30, 1927.

1,640,738

UNITED STATES PATENT OFFICE.

THOMAS F. TAYLOR, OF SAN FRANCISCO, CALIFORNIA.

DIRIGIBLE HEADLIGHT.

Application filed October 21, 1925. Serial No. 63,807.

This invention relates to dirigible headlights for vehicles, and has for its object to provide a simple and inexpensive connection between the steering mechanism of the vehicle and the swiveled headlight for turning the latter in conformity with the changes in the position of the steering wheels, the particular object being to eliminate any tendency of the headlight to vibrate due to the vibrations in the steering mechanism of the vehicle.

In some types of automobiles, especially the Ford, where the steering post is directly connected with the front wheels, it has been a problem of some difficulty to eliminate vibration of the headlight where the latter is connected to the steering post. The present invention affords a solution to this problem by the provision of a spring centering device for the headlight and a loose connection between the steering mechanism and the spring centering device, whereby the headlight is normally held in a central position and a considerable movement of the steering mechanism is necessary to turn the headlight.

Several forms which my invention may assume are exemplified in the following description and illustrated in the accompanying drawings, in which Fig. 1 shows a perspective view of a vehicle equipped with dirigible headlights in accordance with my invention;

Fig. 3 shows a plan view of a vehicle having headlights directly connected to the distance rod of the steering mechanism;

Fig. 4 shows a perspective view of the spring centering device in its preferred form;

Fig. 5 shows a plan view of the same;

Fig. 6 shows a plan view of the loose connection between the distance rod and link of Fig. 3;

Fig. 7 shows an edge view of the same;

Fig. 8 shows an edge view of the loose connection between the steering post and centering device as employed in Figs. 1 and 2;

Fig. 9 shows a plan view of the same;

Fig. 10 shows a plan view of a modified form of spring centering device;

Fig. 11 shows a side elevation of the same;

Fig. 12 shows a front view of the same;

Fig. 13 shows a plan view in section of a further modification of the spring centering device;

Fig. 14 shows a side elevation of the upper part of the radiator of a vehicle, illustrating the mode of mounting the headlight;

Fig. 15 shows a plan view of the connection or bracket for securing the headlight to the radiator.

Figure 1:
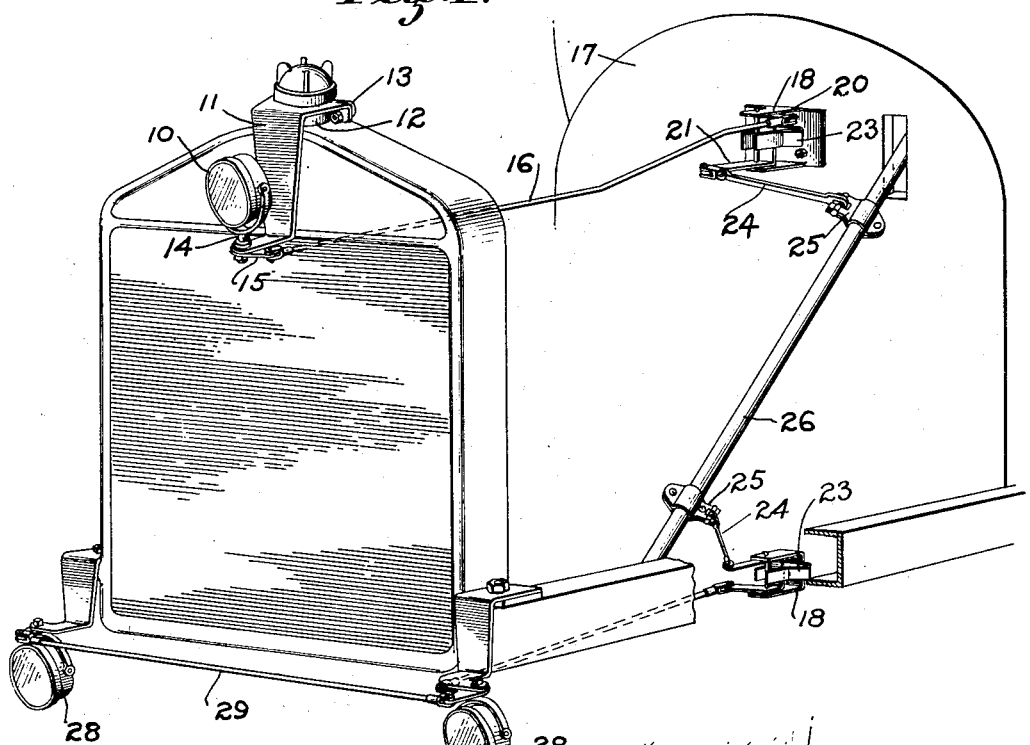

Referring in detail to Fig. 1, I show a vehicle such as a Ford, having a headlight 10 swiveled upon a bracket 11, which bracket is secured to the neck of the radiator 12 by means of any suitable clamping device 13.

Secured to the pin or stem 14 of the headlight is a crank arm 15, and a rod 16 is connected to the crank arm and extends rearwardly through the radiator to a centering device presently to be described, and which is located on the dash 17 of the vehicle, beneath the hood.

Figure 2:
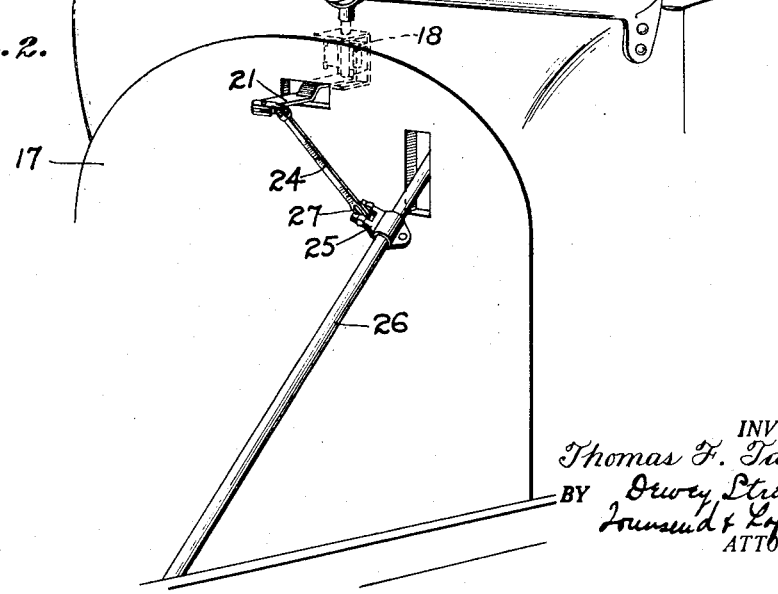
Fig. 2 shows a perspective view of a portion of a vehicle, showing my invention applied to a headlight which is mounted on the cowl of the vehicle.

In Fig. 2 I show a headlight having its stem or supporting pin passing beneath the hood or cowl and directly mounted upon the said centering device.

This centering device as shown in detail in Figs. 1 to 5 inclusive, comprises a U-shaped bracket 18 secured to the dash. Pivoted upon a pin 19 extending between the legs of the bracket are an upper crank arm 20 and a lower crank arm 21 arranged at right angles to each other, and interconnected by a U-shaped web 22. This web lies between a pair of spring arms 23 secured to the bracket and acting to resiliently retain the said web in the neutral or central position. A rigid pin or lug 23ª limits the inward movement of the spring arms, so as to prevent unequal pressure on the opposite sides of the web 22.

The upper crank arm is connected to the rod 16, and the lower crank arm connects with a link 24, which link in turn is connected to an arm 25 on the steering post 26. The connection between the arm 25 and link 24 includes a slot 27 whereby vibrations or minor movements of the steering post will not be imparted to the headlight.

Where the headlight is positioned on the cowl, as shown in Fig. 2, its stem or pin may be mounted directly on the centering device, thereby omitting the arms 15 and 20 and the rods 16. In a similar manner a pair of lamps 28, one at either side of the vehicle and connected together by a distance rod 29, may be controlled from the steering post, in which event the spring centering device may be located on the frame of the vehicle as shown in Fig. 1.

In Fig. 3 I show a pair of lamps 30 mounted upon the front of a vehicle and connected by a link 31 to a spring centering device 32, which spring centering device in turn is directly connected by a link 33 to an arm 34 fastened to the distance rod 35 of the steering mechanism. Such a direct connection between the lamps and distance rod of the steering wheels eliminates a number of parts, and is made possible owing to the fact that the spring centering device will retain the lamps in central position, and by providing a slotted connection 36 between the link 33 and arm 34 the vibrations of the wheels will not be imparted to the lamp, and only the major movements of the wheels will be transmitted to the lamp.

As shown in Fig. 10 to Fig. 12 inclusive, the web 22 may be seated against a spring leaf 37 which extends between the arms of a U-shaped bracket 38.

In Fig. 13 the web 22 rests against a plate 39 which is pressed outwardly by a plunger spring 40 carried in a cup 41.

Having thus described my invention, what I claim as new and desire to secure by Letters Patent is:

1. The combination with a vehicle steering mechanism and a swiveled lamp, of an operating connection between the lamp and steering mechanism, comprising a pair of crank arms pivoted upon the frame of the vehicle and having a projecting portion near their pivoted ends, a spring acting against the projecting portion for maintaining the crank arms in central position, a loose connection between the steering mechanism and one of said crank arms, and a rigid connection between the other crank and the lamp.

2. The combination with a vehicle steering mechanism and a swiveled lamp, of a bell crank pivoted upon the frame of the vehicle, a projecting portion on the crank adjacent its pivoted end, a spring pressing against the projecting portion to maintain the crank in central position, a loose connection between one crank member and the steering mechanism, and a rigid connection between the other crank member and the lamp.

3. The combination with a vehicle steering mechanism and a swiveled lamp, of a pair of cranks mounted upon the frame of the vehicle and having an intermediate offset web portion, a spring acting against said web portion for maintaining the cranks in central position, a link fastened to one of said cranks and loosely connected to the steering mechanism, and a link forming a rigid connection between the other crank and the lamp.

4. The combination with a vehicle steering mechanism and a swiveled lamp, of a bracket fixed upon the frame of the vehicle, a pair of cranks with intermediate offset web portion pivoted upon the bracket, a link connecting one of said cranks with the lamp, a second link connecting the other crank loosely with the steering mechanism, and a spring pressing against said web portion for maintaining the cranks in central position.

5. In combination with the steering wheels of an automobile, a distance rod forming a part of the steering mechanism, a lamp swiveled on the vehicle frame, a pair of crank arms pivoted on the frame of the vehicle, a link connecting one of said crank arms with the lamp, a member on said crank arms projecting beyond the pivoted ends thereof, a loose connection between the other crank and the distance rod, and a spring acting against the projecting member of the crank arms for maintaining the latter in central position.

6. The combination with a vehicle steering mechanism and a swiveled lamp, of an operating connection between the lamp and steering mechanism comprising a pair of crank arms pivoted on the frame of the vehicle, a substantially U-shaped member connecting said crank arms together adjacent their pivoted ends, a pair of spring arms embracing said U-shaped member for maintaining the crank arms in central position, a loose connection between the steering mechanism and one of said crank arms, and a rigid connection between the other crank arm and the lamp.

THOMAS F. TAYLOR.